US007660024B2

United States Patent
Aye et al.

(10) Patent No.: US 7,660,024 B2
(45) Date of Patent: Feb. 9, 2010

(54) 3-D HLCD SYSTEM AND METHOD OF MAKING

(75) Inventors: Tin Maung Aye, Mission Viejo, CA (US); Kevin H. Yu, Temple City, CA (US); Gajendra . Savant, Rolling Hills Estates, CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/920,071

(22) Filed: Aug. 1, 2001

(65) Prior Publication Data

US 2002/0018040 A1 Feb. 14, 2002

Related U.S. Application Data

(60) Provisional application No. 60/223,663, filed on Aug. 7, 2000.

(51) Int. Cl.
*G03H 1/26* (2006.01)
(52) U.S. Cl. .............................. 359/22; 359/23; 359/900
(58) Field of Classification Search .................. 359/15, 359/22, 23, 462; 349/5, 15, 202
See application file for complete search history.

(56) References Cited

U.S. PATENT DOCUMENTS 4,993,790 A 2/1991 Vick
5,457,574 A * 10/1995 Eichenlaub .................. 359/619
5,506,701 A 4/1996 Ichikawa
5,886,675 A 3/1999 Aye et al.
6,081,354 A * 6/2000 Gambogi ...................... 359/15
6,157,474 A * 12/2000 Orr ............................. 359/23

FOREIGN PATENT DOCUMENTS

EP 0678761 10/1995
WO WO95/34008 12/1994
WO WO97/13175 4/1997

OTHER PUBLICATIONS

Real-Time 3-D Color Display Using a Holographic Optical Element, SPIE vol. 2652 pp. 124-131, 1996 by K. Sakamoto et al.

* cited by examiner

*Primary Examiner*—Arnel C Lavarias
(74) *Attorney, Agent, or Firm*—Sheppard Mullin Richter & Hampton LLP

(57) ABSTRACT

An autostereoscopic three-dimensional liquid crystal display system and a method of making the system. The system includes a collimated backlight, a first light diffracting hologram, a second right-left interlacing hologram and a liquid crystal display. If the backlight is not collimated, a microcollimator array is used to collimate the backlight prior to passing into the first hologram. The second right-left interlacing hologram is formed through a two step process. The process comprises positioning a photolithographic mask and a view region mask in a first position, recording the first holographic recording in the first position, shifting the photolithographic mask and the view region mask to a second position and recording the second holographic recording in the second position.

6 Claims, 6 Drawing Sheets

RECORDING 1 - MASK POSITION 1

RECORDING 2 - MASK POSITION 2

*RECORDING 1 - MASK POSITION 1*

*RECORDING 2 - MASK POSITION 2*

3-D HLCD SYSTEM AND METHOD OF MAKING

RELATED APPLICATION

This application claims the benefit of U.S. Provisional Application Ser. No. 60/223,663 filed Aug. 7, 2000, which is hereby incorporated herein by reference.

BACKGROUND OF THE INVENTION

1. Field of the Invention

The present invention relates generally to the field of three-dimensional (3-D) displays. More particularly, the present invention concerns 3-D Holographic Liquid Crystal Displays (HLCD) that do not require the viewer to wear goggles or glasses. The present invention thus relates to 3-D HLCD systems of the type that can be termed autostereoscopic. The present invention is further directed to a method of making a right-left eye view multiplexed hologram for use in the 3-D HLCD display.

2. Discussion of the Related Art

High performance display systems are key components in virtually all system interfaces for scientific and engineering instrumentation. For example, three-dimensional imaging provides a great advantage in medical imaging, such as neuroscience research and other research that relies on the visualization of three-dimensional structures.

Scientific visualization, simulation, and instrument design are typically carried out using scientific workstations, powerful image-processing and computer-graphics software, and special hardware designed to render pseudo three-dimensional pictures on two-dimensional displays. Unfortunately, these systems lack significant aspects of image content because they rely on the viewer's interpretation of two-dimensional visual depth cues to produce a three-dimensional image. Adding a third dimension to the visual display greatly enhances the viewer's ability to perceive and interpret precise spatial relations of imagery.

Several three-dimensional display techniques have been developed but their application is limited by many factors. These factors include the need for external devices such as scanners and projectors, the inability to display flicker-free images in real time, limited viewing range reduced resolution, reliance on special image data formatting and scanning, and increased cost. Therefore, a need exists for a cost-effective, three-dimensional display unit that readily interfaces with a conventional two-dimensional display format, permits real-time interactivity with wide, field-of-view "look around" capability, and supports a three-dimensional autostereoscopic visualization.

SUMMARY AND OBJECTS OF THE INVENTION

It is an object of the present invention to provide a high-resolution, high quality, full color, autostereoscopic three-dimensional images, produced by means of a multiplexed holographic diffraction grating structure.

It is further an object of the present invention to provide a system that confines projected light to the required display and viewing structures.

In is another object of the present invention to provide a three-dimensional viewing system that is cost effective, compact and compatible with conventional two-dimensional flat panel LCD display technology.

It is another object of the present invention to provide a three-dimensional viewing system that is compatible with conventional two-dimensional displays and video transmission formats.

It is another object of the present invention to provide a three-dimensional viewing system that provides wide look-around field-of view.

Finally, it is an object of the present invention to provide a hologram multiplexed waveguide containing a holographic recording of a right visual field and a left visual field.

In accordance with these objectives, the present invention provides an autostereoscopic, high-resolution wide look around field-of-view, compact, flat-panel, three-dimensional holographic liquid crystal display (HLCD) system. The system comprises a backlit LCD modified with a novel, switchable backlighting panel formed of special multiplexed holograms.

More specifically, the system comprises a backlight, a first light diffracting hologram, a second right-left visual field multiplexing waveguide hologram and an LCD. If the backlight is not collimated such as those used in conventional LCD displays, a micro-collimator array may be placed between the backlight and the first hologram to provide collimated light.

The system creates three-dimensional parallax depth cues by presenting each eye with a view of the object from a different perspective. Conventional three-dimensional viewing methods rely upon special viewing devices such as goggles and special viewing glasses to channel the light to the appropriate eye. The system of the current invention, however, utilizes a novel right-left visual field multiplexed waveguide hologram to channel the light to either the right or left eye within the system, thereby eliminating the need for external viewing devices.

A novel right-left visual field multiplexing waveguide hologram master for use in the viewing system is formed through a recording process utilizing a combination of a photolithographic mask and a view region mask in conjunction with a waveguide holographic recording involving an object beam and a reference beam in a waveguide propagation mode. The multiplexed waveguide hologram recording process comprises a two step process; a first holographic recording corresponding to a first eye viewing zone is formed, and then a second holographic recording corresponding to the second eye viewing zone is formed. The multiplexed waveguide hologram master is then used to form holographic contact copies that provide a cost-effective method of transforming a conventional LCD display into an autostereoscopic 3D HLCD display system. An important aspect of this invention is that the waveguide hologram provides a means to keep unwanted light from being seen by the viewer.

Another aspect of the present invention is to provide multiple left-right viewing fields and a head position tracking camera so that correct 3-D perspective view can be displayed according to the viewer's eye position.

Other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification: wherein, like reference numerals designate the same elements in the several views, and in which.

DETAILED DESCRIPTION OF THE INVENTION

The present invention and the various features and advantageous details thereof are explained more fully with reference to the non-limiting embodiments described in detail in the following description.

1. System Overview

Figure 1:
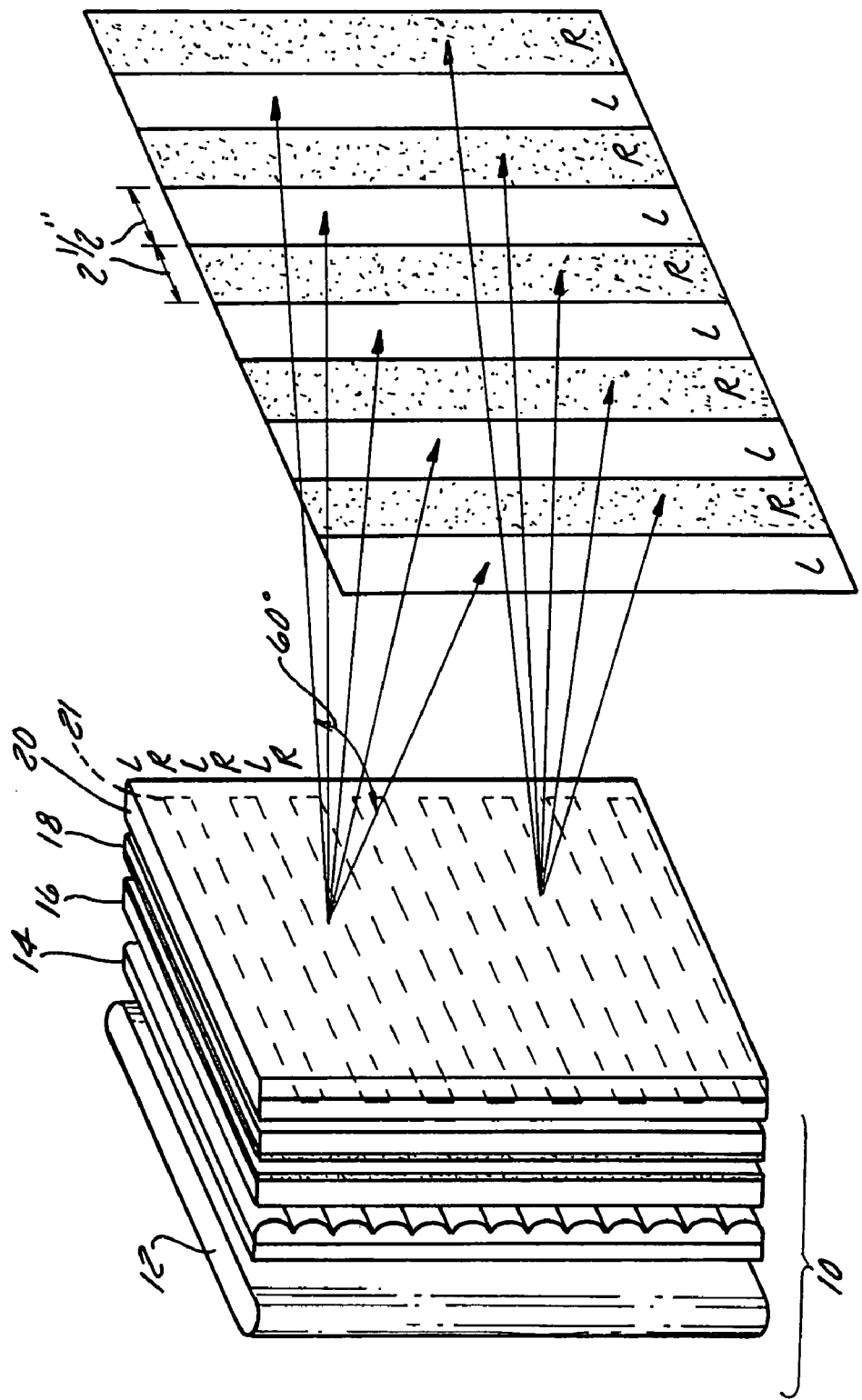
FIG. 1 illustrates a schematic view of the 3D HLCD system.

As shown in FIG. 1, the present invention provides an autostereoscopic, full-resolution, compact, wide look around flat field-of-view, flat-panel, three dimensional display system. The system 10 comprises a backlit LCD modified with a novel, switchable backlighting panel formed of a collimated backlight 12, micro-collimator array 14, a first hologram 16, a second hologram 18 and a standard LCD 20.

When assembled and in use, the backlight 12 transmits light through the mirco-collimator array 14. The micro-collimator array 14 projects the collimated light toward the first waveguide hologram 16 at a predetermined angle, preferably zero degrees. The first hologram 16 then diffracts the light with an angle greater than the critical angle, preferably 45 degrees, and disperses it into various wavelengths. The first and second holographic recordings within the second waveguide hologram 18 then deflect the light to corresponding first and second viewing zones before exiting through the corresponding odd and even pixels of the LCD display 20. Each element of the system 10 will be discussed in greater detail in the following sections.

2. The 3D HLCD Apparatus

Figure 2:
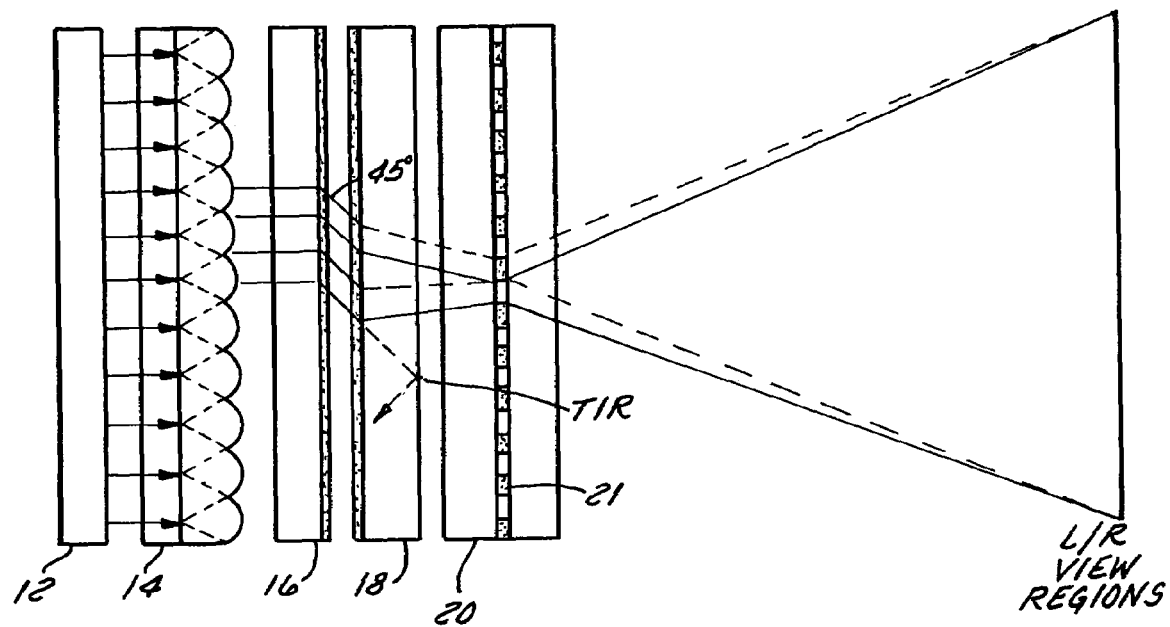
FIG. 2 illustrates an exploded schematic view of the system elements.
Figure 2A:
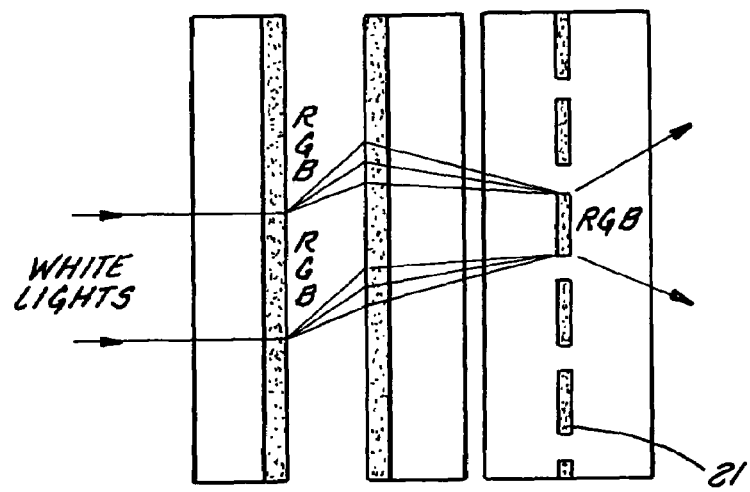
FIG. 2A illustrates an exploded schematic view of the collimated light passing through LCD pixels.

As shown in FIGS. 2 and 2A, the system comprises a backlight 12, a micro-collimator array 14, a first hologram 16, a second hologram 18 and a standard LCD 20 containing pixels 21.

A. The Backlight

The backlight 12 may be a conventional collimated light. Fore example, the light may be a compact, low power white light collimated illumination source. The light may be formed through various methods including using a low power metal halide lamp with a Fresnel lens having a short focal length.

B. The Micro-Collimator Array and Method of Making

Figure 3:
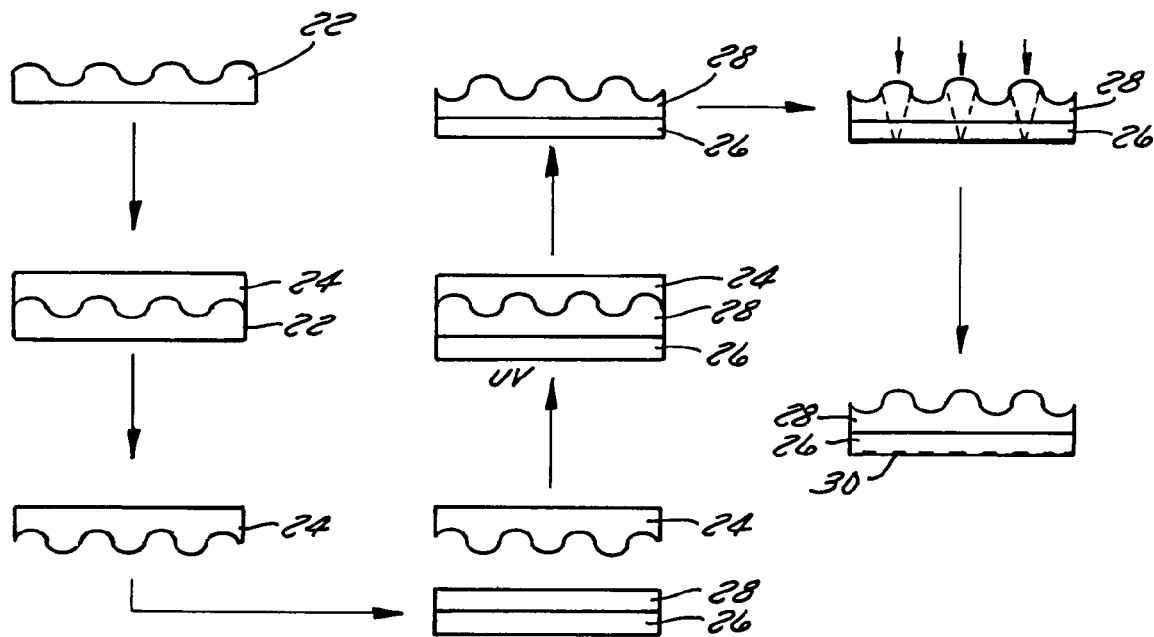
FIG. 3 illustrates a schematic view of the method of making a micro-collimator array.

The micro-collimator array 14 may be used to collimate the backlight source is not collimated (i.e. diffused). The pinhole formed at the focal point of each micro-lense concentrates and collimates the light. The micro-collimator array 14 is formed through the following process as shown in FIG. 3.

An appropriate commercially available micro-lens master 22 is selected. A rubber negative 24 of the master is formed of rubber or other suitable material. A substrate 26 is coated with UV curable epoxy 28 preferably having an index of refraction between 1.48 and 1.65. The rubber negative 24 is then pressed into the epoxy 28 to form the micro-lenses 22 of the micro-collimated array 14. As the rubber negative 24 is pressed into the epoxy 28, UV light is directed through the epoxy coated substrate 26 to cure the epoxy 28. After the rubber negative 24 is removed, the substrate 26 side of the micro-collimator array 14 is coated with a mixture of black dye and containing Shipley positive photoresist composition. UV light is then directed through each of the micro-lenses 22. The curvature of the micro-lenses 22 focuses the UV light on focal points 30 along the substrate 26, softening the substrate at each focal point 30. An etching solution is then applied to the substrate 26, forming the pinholes within the micro-collimator array 14.

C. The First Hologram and Method of Making

Figure 4:
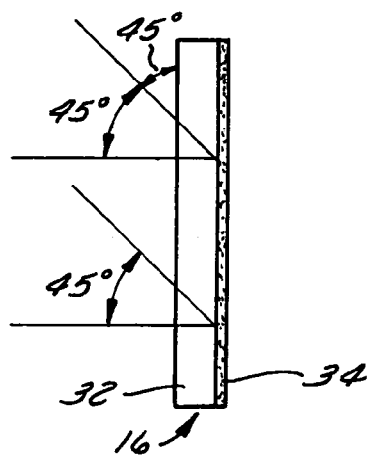
FIG. 4 illustrates a schematic view of the recording process of the first hologram.

Referring now to FIG. 4, the first hologram 16 is used to direct the light to the second hologram at a predetermined angle preferably between 45 to 50 degrees off the horizontal (i.e., greater than the angle of reflection) and spreads the light into red, green and blue spectral images. The first hologram is formed from through a conventional two-beam recording process. More specifically, a holographic plate substrate 32 is coated with a photosensitive emulsion 34 such as silver halide. A diffused object beam and a collimated reference beam pass through the substrate 32 and into the emulsion 34 to record a hologram that disperses light between 45-50 degrees off horizontal. The resulting hologram disperses the light projected through the micro-collimator array 14 into separate red, green and blue spectral images.

D. The Second Hologram and Method of Making

Figure 5:
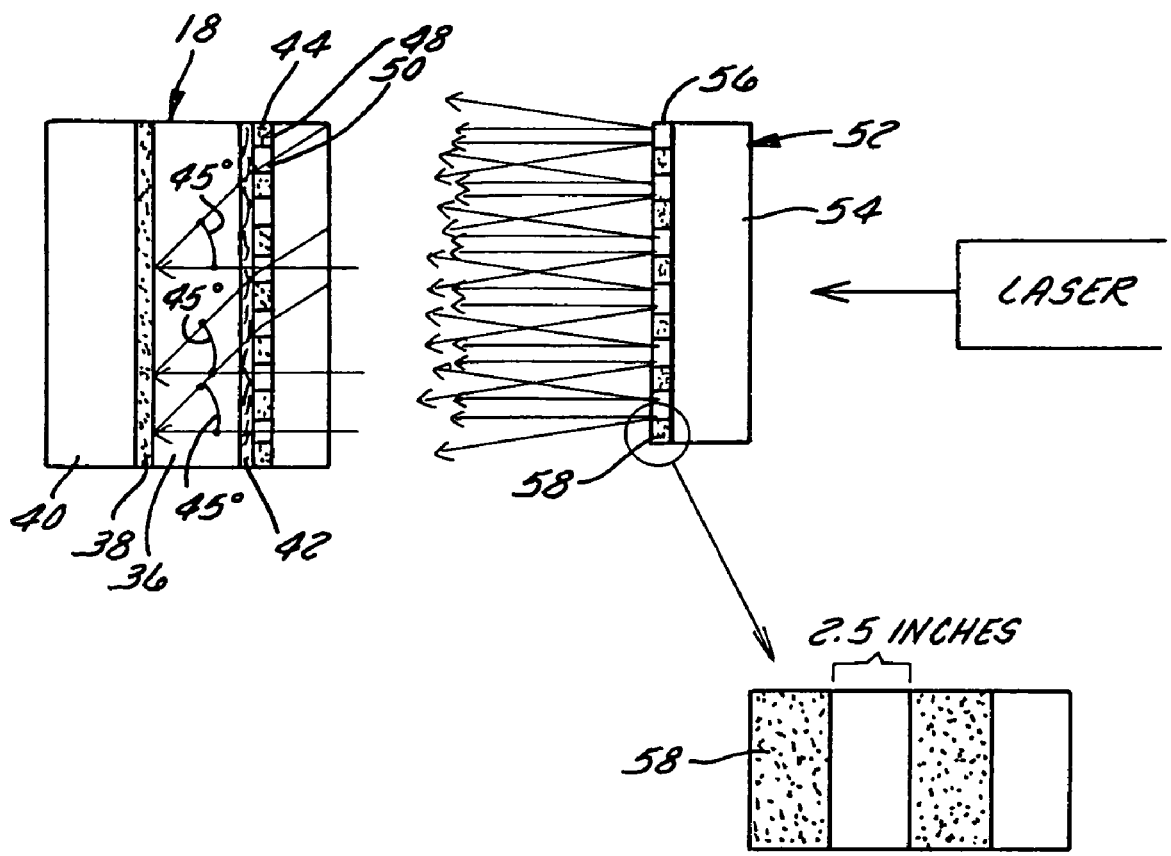
FIG. 5 illustrates a schematic view of the recording process of the second hologram master.
Figure 6:
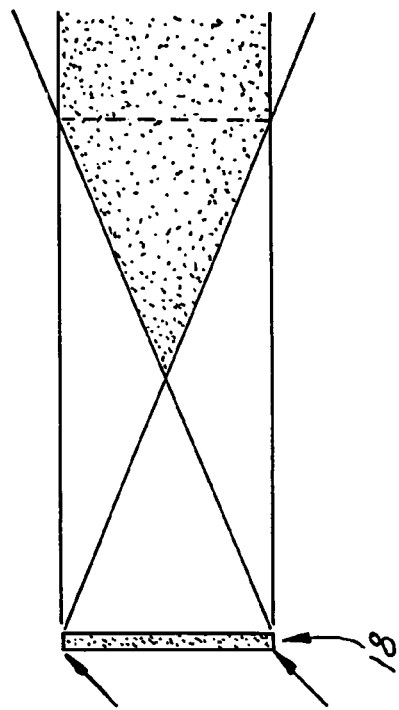
FIG. 6 illustrates the alternating right and left viewing fields formed by the second hologram.
Figure 6:
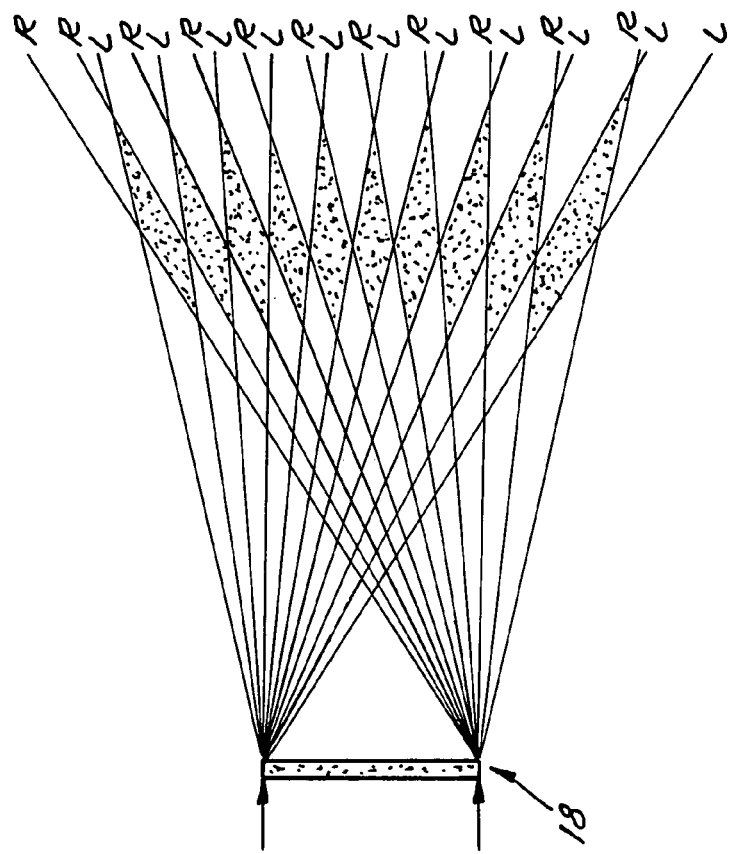

The second hologram 18 as shown in FIG. 5 comprises two separate interlaced holographic recordings. One recording corresponds to a right visual field and the other corresponds to a left visual field. When viewed, the final hologram produces alternating right and left holographic that corresponds directly to pixels in the LCD as illustrated in FIG. 6 which creates a three-dimensional effect. Each alternating right and left recording is a predetermined width. This width is equal to the width of an LCD pixel, preferably 200 microns, the width of a standard LCD pixel.

The second hologram 18 or the right-left interlaced hologram master is formed through the following process. As shown in FIG. 5 a holographic plate or substrate 36 is coated with a photosensitive emulsion 38, preferably silver halide. The coated substrate 36 is then mounted onto a gray glass plate holder 40 so that the emulsion layer 38 is facing toward the gray glass plate holder 40. The exposed side of the coated substrate 36 is then coated with an indexing fluid 42 such as ISOPAR®.

1. The Photolithographic Mask

A photolithographic mask 44 is placed over the emulsion layer 38 coated with indexing fluid 42 prior to recording. The mask 44 provides a series of equally spaced lines. Each line having a width equal to the width of a standard LCD pixel, preferably between 200 to 300 microns. For example, if the odd number lines are black 48 and the even number lines are clear 50, the odd number lines act as a mask, blocking holographic recording under the odd numbered lines of the mask 48.

2. View Region Mask

It is well known that humans perceive three-dimensions because the information received by the right eye is slightly different than the information received by the left eye. The separation of approximately 2.5 inches between the right and left eyes results in these perceived differences which converge to provide depth cues that create a three dimensional effect. This concept is mimicked through the use of the view region mask 52 during the holographic recording process as shown in FIG. 5.

A view region mask diffuser 52 is used to block out either the left visual field or the right visual field during a holographic recording. The view region mask diffuser 52 comprises a substrate 54 and a view region mask 56.

The view region mask 56 provides a series of blacked out regions 58. Each blacked out region 58 is 2.5 inches wide and 2.5 inches apart from the next blacked out region 58. During the recording process, the view region mask 56 is placed in the path of the object beam. The blacked out region 58 will block out either the left or the right half of the object beam.

The view region mask 56 is used in conjunction with the photolithographic mask 46 to create a first holographic recording and a second holographic recording which interlace to create separate right and left visual fields.

Figure 7:
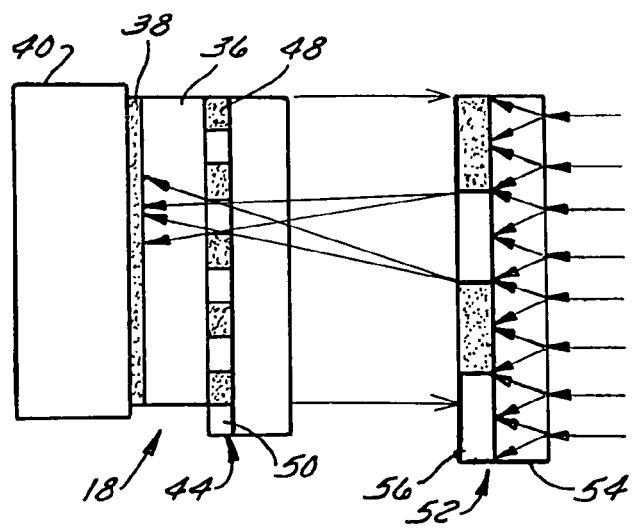
FIG. 7 illustrates the positions of the photolithographic mask and view region mask during the first holographic recording and the second holographic recording.
Figure 7:
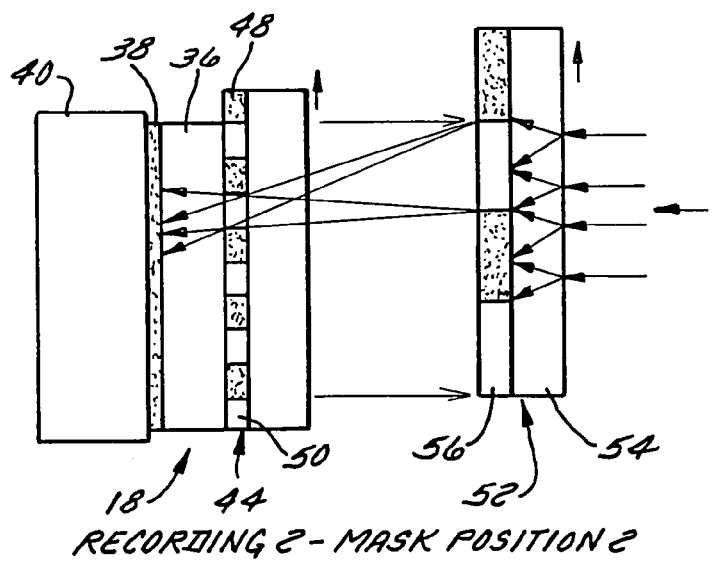

Referring now to FIG. 6 and FIG. 7, both the photolithographic mask 44 and the view region mask 56 have a first position and a second position. During the first holographic recording, both the photolithographic mask 44 and the view region mask 56 must be in a first position. Both the photolithographic mask 44 and the view region mask 56 must then be shifted into their second position before the commencement of the second holographic recording.

For example, if the photolithographic mask 44 masks the area corresponding to the odd number pixels of the LCD, and the view region mask 56 blocks the right viewing region during the formation of the first holographic recording, the photolithographic mask 44 must mask the area corresponding to the even numbered pixels of the LCD and, the view region mask 56 must block the left viewing region during the formation of the second holographic recording.

The holographic recordings are formed through a two-beam recording process as shown in FIG. 5. The first holographic recording is formed by passing the object beam through the view region mask diffuser 56 positioned at a distance equal to the system's desired playback distance and then through the photolithographic mask 44. The reference beam passes through the photolithographic mask 44 at an angle equal to the reference angle used to record the first hologram, preferably between 45-50 degrees off horizontal. The photolithographic mask 44 and the view region mask 56 are then shifted from the first position to the second and the recording is repeated to form the second holographic recording.

The first holographic recording creates a plurality of holograms of a predetermined width, which are separated by blank spaces of the same predetermined width. The second holographic recording creates a plurality of holograms with slits that fill in the blank spaces present after the first holographic recording.

Copies of the right-left interlaced hologram master 18 are then made through contact copying wherein the master 18 is copied with conventional procedure utilizing a 45 degree reference laser beam having a wavelength of 514 nanometers.

Figure 8:
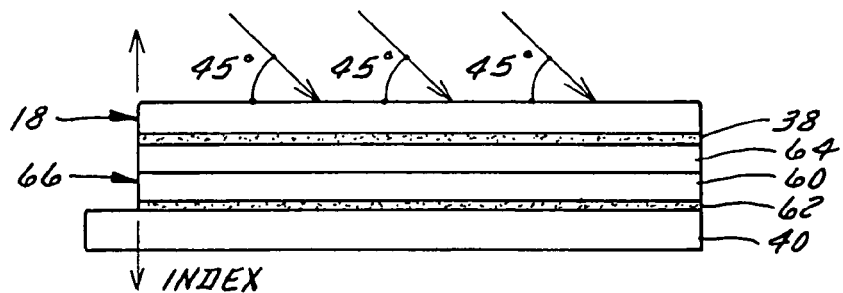
FIG. 8 illustrates a schematic view of a method of copying the second hologram master.

More specifically, as shown in FIG. 8, a contact copy 66 of the right-left interlaced hologram through the following process. A holographic plate 60 coated with a photosensitive emulsion 62, such as silver halide, which forms the contact copy 66, is loaded onto a gray glass plate holder 40 with the photosensitive emulsion 62 in contact with the gray glass plate 40. A glass spacer 64 is positioned over the holographic plate 60. The spacer 64 is preferably 1 mm thick. The right-left interlaced hologram master 18 is the positioned over the glass spacer 64 so that the emulsion coated side of the master 18 is in contact with the spacer 64. The coated holographic plate 60, the spacer 64 and the master 18 are indexed so that the emulsion coating on the holographic plate and the emulsion layer on the master are separated by a distance equal to the thickness of the LCD substrate, preferably 1 mm. The contact copy 66 is then recorded by passing a single reference beam through he master 18, spacer 64, holographic plate 60, and photosensitive emulsion layer 62 at a predetermined angle, preferably 45 degrees for a predetermined exposure time. The contact copy 66 is then developed through photochemical processing. There are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. For example, the individual components need not be fabricated from the disclosed materials, but could be fabricated from virtually any suitable materials. Further, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

What is claimed is:

1. A method of making an interlaced waveguide hologram master comprising:
    forming a first holographic recording by positioning a photolithographic mask at a first position over a substrate coated with emulsion and indexing fluid;
    positioning a view region mask in a corresponding first position;
    forming a second holographic recording by positioning the photolithographic mask at a second position over the substrate coated with emulsion and indexing fluid; and
    positioning the view region mask in a corresponding second position, wherein the second holographic recording is interlaced with the first holographic recording, the view region mask comprises a series of blacked out regions separated by a distance of approximately 2.5 inches; and each of the photolithographic and viewing masks has a series of light transmissive openings having selected inter-distance between the light transmissive openings.

2. The method of claim 1, wherein the first position corresponds a to a right viewing field and the second position corresponds to a left viewing field.

3. The method of claim 1, wherein the photolithographic mask comprises a series of equally spaced lines, wherein predetermined lines mask holographic recording.

4. The method of claim 3, wherein each line has a width approximately equal to the width of a standard pixel.

5. The method of claim 4, wherein the width of each line is between approximately 200 to 300 microns.

6. The method of claim 1, wherein the emulsion is formed of silver halide.

* * * * *